Jan. 11, 1966  H. H. HEYDN  3,228,060
SAUSAGE LINKING APPARATUS
Filed April 14, 1964  2 Sheets-Sheet 1
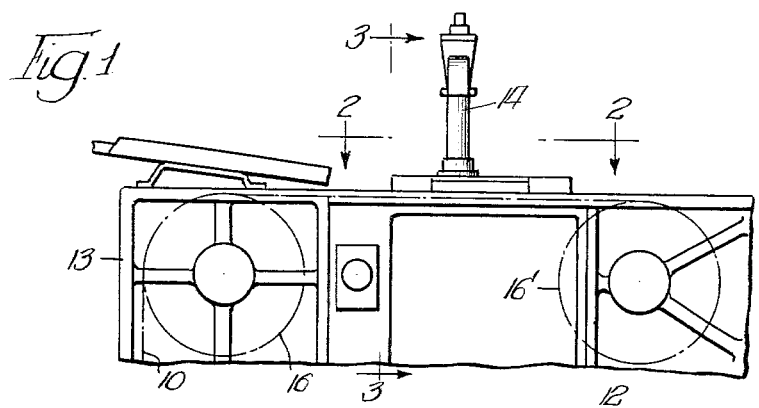
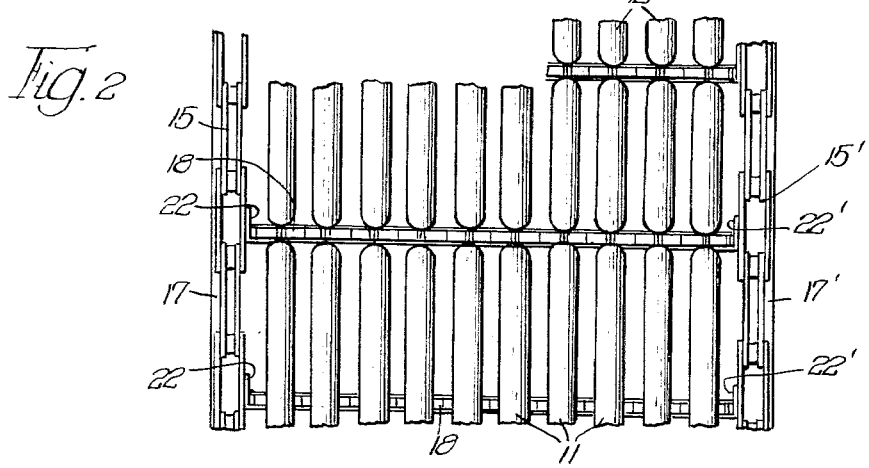
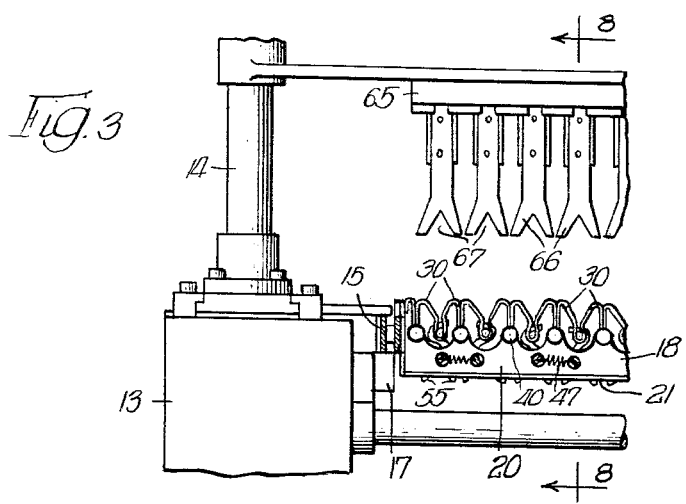
INVENTOR.
Hans H. Heydn,
BY
Greist Lockwood, Grunawalt & Dewey.
ATTYS

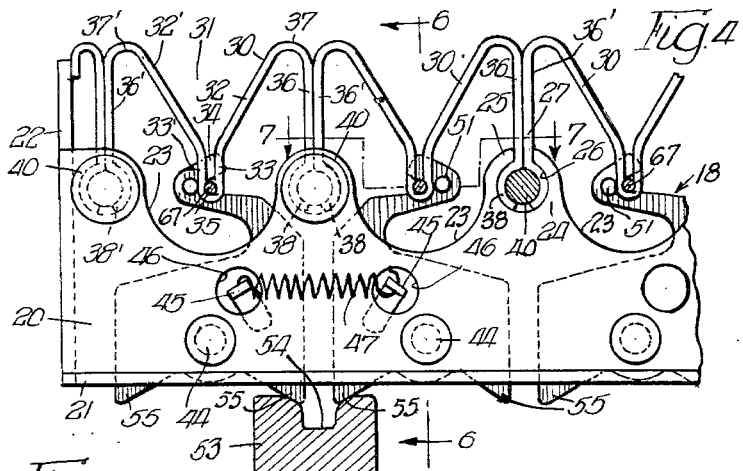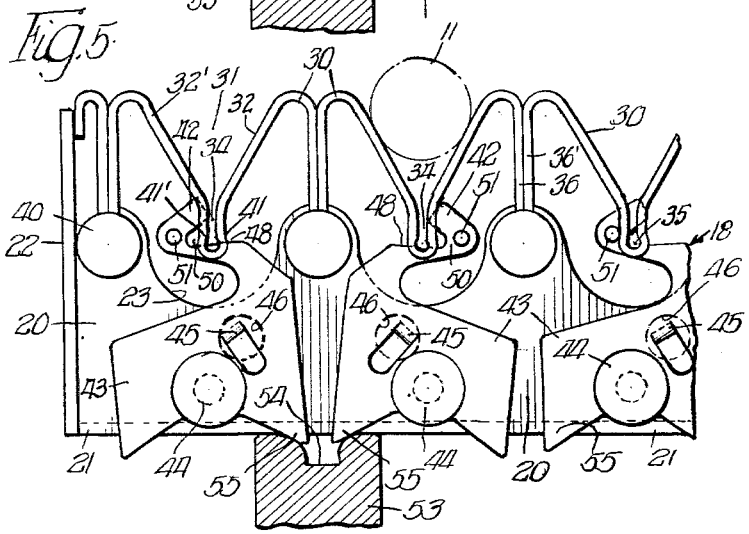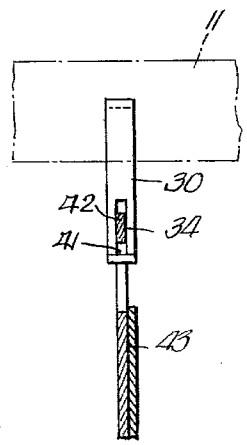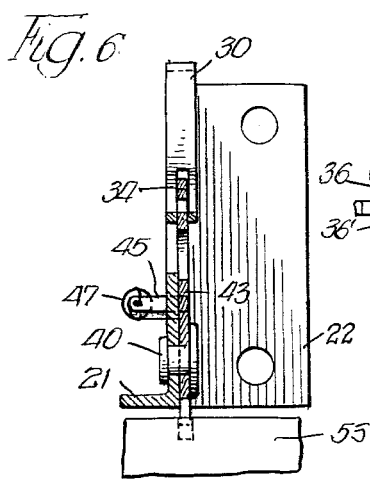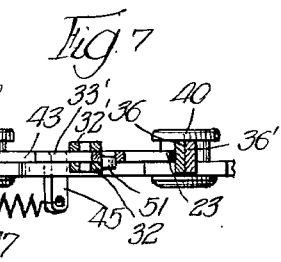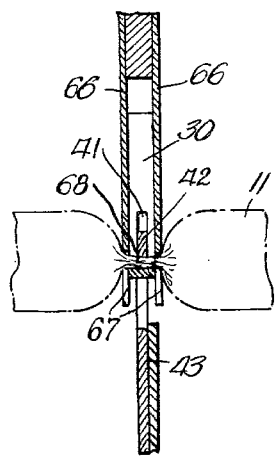

United States Patent Office 3,228,060
Patented Jan. 11, 1966

3,228,060
SAUSAGE LINKING APPARATUS
Hans H. Heydn, Madison, Wis., assignor to Oscar Mayer
& Co., Inc., Chicago, Ill., a corporation of Illinois
Filed Apr. 14, 1964, Ser. No. 359,692
5 Claims. (Cl. 17—34)

This invention relates to the manufacture of sausages and is more particularly concerned with apparatus for dividing relatively long lengths of filled or stuffed sausage casings into links by constricting the casing at intervals corresponding to the desired length of sausages and thereafter retaining the links in connected relation on a conveyor which carries them through processing chambers where they are cooked, smoked and otherwise prepared for marketing.

It is a general object of the invention to provide improved apparatus for dividing stuffed sausage casings into link forming links which is particularly adapted for incorporation in a sausage linking and processing operation of the type disclosed in co-pending application Serial No. 185,167, filed April 4, 1962, and in Patent No. 3,059,272, dated October 23, 1962.

It is a more specific object of the invention to provide in a sausage linking and conveying apparatus of the type in which a plurality of links of stuffed sausage casings are fed in parallel paths to a traveling conveyor on which the casings are divided into link forming sections and thereafter advanced to processing chambers, an improved linking bar assembly for the conveyor which has a plurality of individual casing constricting and holding devices mounted in side-by-side relation on a supporting bar extending transversely of the conveyor with each of the linking devices adapted to constrict a section of the stuffed casing so as to form a neck portion between successive links.

It is a still further object of the invention to provide in a sausage linking machine having a link supporting and carrying conveyor which includes longitudinally spaced cross bars each of which has mounted thereon a plurality of casing constricting devices which are aligned longitudinally of the conveyor to permit multiple lines of casings to be divided into sausage forming links, the casing constricting devices each having associated therewith a locking member for retaining the constricted portion of the casing on the associated cross bar and preventing accidental removal or release therefrom while the links are carried through the processing chambers.

It is another object of the invention to provide a link forming assembly for a sausage linking machine which comprises a supporting bar extending transversely of the linking conveyor and having a plurality of necking devices mounted in side-by-side relation thereon which are adapted to receive lines of stuffed casing and to constrict the casings at intervals as as to form the same into links, and with each necking device having an associated locking finger normally holding the constricted neck forming portion of the casing on the supporting bar, the locking finger being adapted to be pivoted to a position for releasing the links by engagement with associated cam rails so as to permit removal of the links from the conveyor.

These and other objects and advantages of the invention will be apparent from a consideration of the apparatus which is shown by way of illustration in the accompanying drawings wherein:

FIGURE 1 is an elevation of a portion of a sausage linking and conveying apparatus which embodies the principal features of the invention, the apparatus being shown in part diagrammatically;

FIGURE 2 is a transverse view, taken generally on the line 2—2 of FIGURE 1 to an enlarged scale showing a portion of the linking and carrying conveyor;

FIGURE 3 is a cross section taken generally on the line 3—3 of FIGURE 2 and illustrating an end portion of one of the link forming cross bar assemblies and associated casing constricting mechanism;

FIGURE 4 is a fragmentary view, to an enlarged scale, showing one end of a cross bar assembly, with portions broken away;

FIGURE 5 is a fragmentary view, similar to FIGURE 4, but taken at the other end of the cross bar assembly and showing the opposite face thereof;

FIGURE 6 is a cross section taken on the line 6—6 of FIGURE 4;

FIGURE 7 is a fragmentary cross section taken on the line 7—7 of FIGURE 4;

FIGURE 8 is a fragmentary cross section taken on the line 8—8 of FIGURE 3, to an enlarged scale; and FIGURE 9 is a fragmentary cross section, similar to FIGURE 8, with the link forming members in a different position.

Referring to FIGURES 1 to 3 of the drawings, there is illustrated a portion of a continuously traveling, endless conveyor 10 which forms the link receiving and supporting conveyor for an apparatus which is adapted to divide a plurality of lengths of stuffed sausage casings 11 into link forming sections 12 and thereafter advance the links through cooking, smoking and like processing chambers in a continuous operation. The conveyor 10 is suitable for use in a link forming and processing apparatus of the type illustrated in co-pending application Serial No. 185,167, filed April 4, 1962, which may be referred to for details of the apparatus not hereinafter described.

The conveyor 10 has a horizontally disposed upper run at one end of the apparatus which is supported on an upright stand 13. The stand 13 also supports a frame 14 extending vertically above the upper run of the conveyor 10 on which there is mounted for reciprocation, in a vertical plane, a plurality of devices which co-operate with casing constricting and gathering devices on the conveyor 10 for dividing each of a plurality of links of stuffed sausage casings 11, which are fed thereto in parallel, laterally spaced reation, into a connected series of link forming sections 12, the latter being locked on the conveyor 10 while they are carried through the processing chambers by the conveyor.

The conveyor 10 in which the sausage links 12 are formed comprises a pair of endless chains 15 and 15' (FIGURE 2) which are disposed in transversely spaced, parallel relation and carried on suitable sprockets spaced throughout the processing machine, two of the sprockets being indicated at 16 and 16' in FIGURE 1. Chains 15 and 15' are supported on guide rail members 17 and 17' mounted on the sides of the supporting stand 13 at the link forming station so that the upper run of the conveyor travels in a generally horizontal path during the linking operation. A plurality of cross bar assemblies 18 extend between chains 15 and 15' and are spaced longitudinally of the conveyor with the spacing between the assemblies 18 corresponding to the length desired for the links 12. Each of the link forming cross bar assemblies 18 comprises a single plate-like support bar 20 (FIGURES 3 to 9) which has a reinforcing flange or rib 21 extending along its innermost edge and angle bracket forming members 22 and 22' at its ends for attachment to the chains 15 and 15'. The support bars or plates 20 are mounted in transversely extending parallel relation on the chains 15 and 15' and are spaced longitudinally thereof according to the size desired for the links 12.

Each of the support bars 20 (FIGURES 4 to 7) is preferably formed of stiff metal plate and has a plurality of spaced, upwardly opening, semi-circular slots or recesses 23 cut in its upper or outermost margin with the portions 24 of the plate which separate the slots 23 having a concave outer edge at 25 and a circular recess 26 cut therein with a slot 27 forming an entrance thereto from the outer edge 25. Each recess 23 has associated therewith a casing constricting member or device 30. The casing constricting device 30 is formed from a strip of metal of relatively narrow width which is bent so as to provide an outwardly opening, generally V-shaped slot 31 defined by side wall edge forming portions 32 and 32' which are in outwardly diverging relation with their inner ends merging with spaced parallel edge portions 33 and 33' of relatively short length and in confronting relation so as to form a narrow slot 34 which leads to a small pocket 35 of circular cross section. The diverging edge portions 32 and 32' are connected to spaced parallel leg forming strip portions 36 and 36' by outwardly curved sections 37 and 37'. The leg portions 36 and 36' terminate at end portions 38 and 38' which are curved into semi-circular shape so as to fit in the circular recesses 26 on opposite sides of the recesses 23 and to be clamped therein by a rivet forming member 40. The leg portions 36 and 36' of adjoining devices 30 are in abutting relation and each set of legs 36 and 36' has its ends 38 and 38' caught in a recess 26 by one of the rivet assemblies 40. The portions 33 and 33' of the casing constricting device 30 which define the slot or passageway 34 are slotted at 41 and 41' in the plane of the support bar 20 to accommodate a generally C-shaped locking tongue 42 extending at one end or side of a pivotally mounted locking plate 43. The locking plate 43 is secured on the base or support plate 20 by a pivot forming rivet 44 and has a punched out lug 45 which is adapted to extend through a hole 46 in the support plate 20 for attaching thereto one end of a tension spring 47 with the latter having its other end attached to a corresponding lug 45 on the adjoining locking plate 43 so that the locking plates 43 are arranged in pairs and connected by spring 47 and the respective plates of each pair thereof are urged toward each other so as to bring the locking tongues 42 towards each other and into locking position relative to the pockets 35 in the casing constricting devices 30. Each of the locking tongues 42 has a slot 48 with a semi-circular bottom 50 which is approximately the same radius as the radius of the pocket 35 and each tongue 42 carries a stop pin 51 which is adapted to engage with the wall section 33 or 33' thereby to limit the movement of the tongue 42 in a direction for closing the slot 34 and locking the constricted casing in the pocket 35. The latch plates 43 have an edge opposite the tongue 42 which is cut into a V-shape so as to co-operate with an operating cam bar 53. The cam bar 43 has a cam groove 54 in which the triangular end portions 55 of adjoining pairs of the latch plates 43 are adapted to be received. The cam groove 54 is positioned and contoured to draw the plate portions 55 toward each other for withdrawing the latching tongues 42 from latching position in the slots 34. The cam bars 53 may be positioned, relative to the conveyor, at the point of travel of the latter where it is desired to release the links from the linking bar assemblies and permit their removal from the conveyor 10.

In using the apparatus the lengths of stuffed casing 11 are fed so that they are laid in the V-shaped slots 31 defined by the edge forming members 32 and 32' in the cross bar assemblies 18 and the cross bar assemblies 18 are advanced by movement of the conveyor 10 to the linking station (FIGURE 1) where they are disposed beneath the vertically reciprocating cross bar 65 (FIGURE 3) on the frame 14. The cross bar 65 has a plurality of transversely spaced pairs of depending plates 66 which have downwardly opening V-shaped slots 67 in their lower ends. The slots 67 in each pair of plates 66 are aligned in the longitudinal direction of the conveyor 10 and each pair of plates 66 is positioned on the cross bar 65 to place the slots 67 in alignment with the slot 31 in a necking device 30 as the latter is brought into vertical alignment or register beneath the cross bar 65 (FIGURE 8). The cross bar 65 is reciprocated vertically by suitable mechanism (not shown) in timed relation to movement of the cross bar assemblies 18 on the conveyor 10 so as to move the neck forming or casing constricting plates 66 into straddling relation with the casing constricting devices 30 on each successive cross bar assembly 18. The cross bar 65 is moved downwardly a sufficient distance to force the stuffed casings 11 down through the slots 34 and into the pockets 35 where the constricted portions 68 of the casings are held by the locking tongues 42 while the necking plates 66 are raised and the conveyor 10 advances the links beyond the linking station and into the processing chambers.

While particular materials and specific details of construction are referred to in describing the illustrated form of the apparatus, it will be understood that other materials and different structural details may be resorted to within the spirit of the invention.

I claim:

1. In a machine for linking stuffed sausage casings, a traveling conveyor having cross bar assemblies which are spaced a distance apart corresponding to the length of link desired, said cross bar assemblies each comprising a supporting cross bar member having individual casing constricting and holding members mounted in spaced relation along the outer margin thereof, said cross bar member having marginal recesses for accommodating portions of the casing constricting devices with the recesses separated by cross bar portions having apertures in which the casing constricting devices are mounted, each of said casing constricting and holding devices being formed of an elongate narrow strip of metal with the center portion thereof providing an outwardly opening, V-shaped slot formation defined by converging edge portions and a pocket of relatively small size in the bottom of the V which is defined by confronting edge portions at the bottom of said converging edge portions, said pocket forming portions having a slot in a plane extending normal to said edge portions, the end portions of the strip providing spaced parallel legs on opposite sides of the center V-shaped portion with each of the legs having a terminal portion seated in one of the apertures in the portion of the cross bar member between said marginal recesses, and a plate member associated with each of said casing constricting and holding devices which plate member is pivotally mounted on the supporting bar and includes a hook-shaped end disposed in the slot extending into the pocket at the bottom of the V, and said hook-shaped end forming a closure for the entrance to said pocket and co-operating therewith to hold a constricted portion of the casing therein.

2. In a machine for linking stuffed sausage casings, a traveling conveyor having cross bar assemblies which are spaced a distance apart corresponding to the length of link desired, said cross bar assemblies each comprising a plate-like supporting cross bar member having individual casing constricting and holding devices mounted in spaced relation along the outer margin thereof, said cross bar member having slots in its outer margin for accommodating the casing constricting devices with the slots separated by cross bar portions having apertures in which the casing constricting and holding devices are mounted, each of said casing constricting and holding devices being formed of an elongate narrow strip of metal providing an outwardly opening, V-shaped slot formation defined by inwardly converging edge forming portions and having a pocket at the bottom of the V with a relatively short entrance slot defined by spaced parallel edge portions at the inner ends of said converging edge portions, the end sections of the metal strip extending on opposite sides of the V portion and having terminal portions mounted in the apertures in supporting portions of the cross bar member between adjacent marginal slots, and a plate member pivoted on the supporting bar adjacent the bottom of each marginal slot therein below the V-shaped slot formation and each said plate member having a hook forming portion adapted to be moved by pivotal movement of the plate member in a slot in the pocket at the bottom of the V across said entrance slot so as to close the pocket and retain a constricted portion of the casing in the pocket.

3. In a machine for linking stuffed sausage casings, a traveling conveyor having cross bar assemblies which are spaced a distance apart corresponding to the length of link desired, said cross bar assemblies each comprising a supporting cross bar member having individual neck forming and holding members mounted in spaced relation along the outer margin thereof, said cross bar member having marginal recesses for accommodating portions of said neck forming and holding devices with the recesses separated by cross bar portions having means for mounting thereon said neck forming and holding devices, each of said neck forming and holding devices being formed of an elongate narrow metal strip providing an outwardly opening, V-shaped slot formation defined by converging edge portions and a pocket of relatively small size at the bottom of the V, the edge portions forming the pocket having a slot extending in a plane parallel with the plane of the supporting cross bar member, the strip also providing spaced, parallel legs on opposite sides of the V-shaped portion which legs are in the plane of the V-shaped portion with each of the legs having a terminal portion which is secured on the portion of the cross bar member extending between adjoining marginal recesses by said mounting means, and a plate member pivotally mounted on the face of said supporting bar and having a latch forming end disposed in the slot in the pocket defining strip portions at the bottom of the V, and said latch forming end constituting a closure for the entrance to said pocket which is adapted to swing into and out of position to hold a neck forming portion of the casing in said pocket.

4. In a machine as recited in claim 3, and spring means for normally holding said pivotally mounted plate member in pocket closing position and cam means at a predetermined position along said conveyor for pivoting said plate to swing the latch forming end so as to open said pocket and permit the neck forming casing portion to be moved out of said pocket.

5. In a machine for linking stuffed sausage casings, a traveling conveyor having cross bar assemblies which are spaced a distance apart corresponding to the length of link desired, said cross bar assemblies each compressing a supporting cross bar member having a plurality of individual casing constricting and holding members mounted along the outer margin thereof, said cross bar member having marginal recesses for accommodating the casing constricting devices with the recesses separated by cross bar portions on which the casing constricting devices are mounted, each of said casing constricting and holding devices being formed of an elongate narrow metal strip providing an outwardly opening, V-shaped slot formation defined by converging edge portions and a pocket of relatively small size at the bottom of the V, the pocket forming portions having a slot extending in a plane parallel with the plane of the supporting cross bar member, the strip having end portions providing spaced, parallel legs on opposite sides of the center V-shaped portion with each of the legs having a terminal portion mounted on a portion of the cross bar member between adjacent marginal recesses, and a latch plate member pivotally mounted on one face of the supporting bar member with a hook-shaped end disposed for movement in the slot at the bottom of the V, and said hook-shaped end being adapted to move between one position in which it forms another position in which it co-operates therewith to hold a constricted portion of the casing in said pocket, spring means holding the latch plate members in one position and cam members engaging the latch plate members for moving the hook-shaped ends to another position.

References Cited by the Examiner
UNITED STATES PATENTS 1,459,069    6/1923    Kruse _____ 17—34
3,042,963    7/1962    Runge _____ 17—34

SAMUEL KOREN, *Primary Examiner.*

LUCIE H. LAUDENSLAGER, *Examiner.*